March 2, 1954 R. K. ORTHUBER ET AL 2,670,523

METHOD OF CONSTRUCTING ELECTROSTATIC SHUTTER MOSAICS

Filed Feb. 1, 1952

INVENTORS.
RICHARD K. ORTHUBER
JOHN E. CLEMENS
BY BEN B. JOHNSTONE
James S. Shannon
AGENT
Wade Koontz
ATTORNEY Patented Mar. 2, 1954 2,670,523

UNITED STATES PATENT OFFICE 2,670,523

METHOD OF CONSTRUCTING ELECTROSTATIC SHUTTER MOSAICS

Richard K. Orthuber, Fort Wayne, Ind., and John E. Clemens, Xenia, and Ben B. Johnstone, Dayton, Ohio, assignors to the United States of America as represented by the Secretary of the Air Force Application February 1, 1952, Serial No. 269,570

5 Claims. (Cl. 29—25.17)

(Granted under Title 35, U. S. Code (1952), sec. 266)

The invention described herein may be manufactured and used by or for the Government for governmental purposes, without the payment to us of any royalty thereon.

This invention relates to cathode-ray tube mosaics and particularly to a method of preparing mosaics of the electrostatic shutter type for use in cathode-ray tube projection systems.

Such mosaics consist of a multitude of metallic flaps of elemental size attached to a flat substrate which may be either transparent or opaque depending upon the type projection system in which the mosaic is to be used. The electron beam of the cathode-ray tube is caused to scan over the mosaic, or else over a transparent dielectric element placed opposite and close to the mosaic, so as to control the charge on or in the vicinity of the flaps. The resulting electrostatic force acting on each flap causes a bending thereof in proportion to the strength of the force. A projection lens system is used to form an image of the mosaic on a projection screen. Two methods of illuminating the mosaic from the projection light source are possible. In one method, in which the substrate must be transparent, light is passed through the mosaic, with each flap controlling the amount of light passing through the corresponding part of the mosaic to the projection screen as a function of the amount of bending of the flap. In the other method, each elemental flap acts as a small mirror reflecting light from the projection light source into the projection lens in an amount determined by the degree of bending of the particular flap. The mosaic and projection systems of the above type are described and claimed in the applications of Richard K. Orthuber, Serial Numbers 240,772 and 248,439, filed August 7, 1951, and September 26, 1951, respectively.

In a mosaic of the above described type it is desirable that the flap size be as small as possible, that the ratio of total flap area to total mosaic area be as high as possible and, in cases where the flaps act as reflectors, that the flap surfaces be as flat as possible. It is the object of the invention to provide a method of preparing a mosaic which meets these requirements.

The method will be described in more detail in connection with the accompanying drawings in which.

Figures 1, 2:
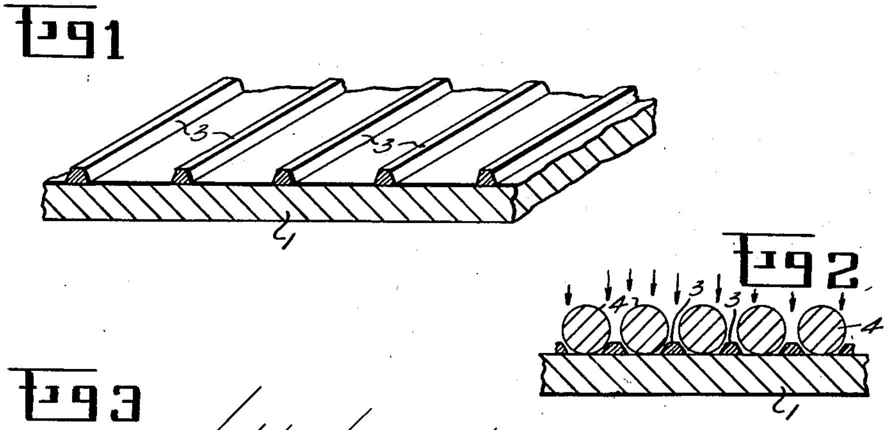
Fig. 1 shows the flap supporting bars on the substrate.
Fig. 2 shows a suitable mask for forming bars in the substrate by condensation.

As already stated an electrostatic shutter mosaic consists of a multitude of minute substantially rectangular flaps each attached along one edge to a flat substrate. The flaps are arranged in an orthogonal system of equally spaced rows. In general, the number of such rows should be at least equal to and preferably higher than the number of horizontal scanning lines contained in one complete frame in the television system, and the dimensions of the flaps should be not greater than the height of the mosaic divided by the number of scanning lines. The substrate, designated in the drawings by the numeral 1, may be transparent or opaque as already explained. Mica or glass are suitable materials for a nonconductive transparent substrate. For a conductive transparent substrate the mica or glass may be covered with a thin transparent metallic film. A suitable metal such as aluminum may be used for an opaque mosaic. The flaps, generally designated by the numeral 2 in the drawings, are made of metal such as aluminum or other opaque or reflective material, are preferably of rectangular shape and are connected to the substrate at one edge only. The flexibility of the attaching portions of the flaps must be such that the electrostatic forces acting upon them, as a result of electric charges applied to or near them by the electron beam can bend the flaps to a degree detectable with the optical system used.

The first step in the method of preparing a mosaic of the above type, as shown in Fig. 1, is the application of a number of closely spaced parallel bars 3, of a persistent material such as silver or aluminum, to the substrate. This step is preferably accomplished by a photoengraving process. The substrate 1 is first coated, by evaporation or electroplating, with a layer of the material of which bars 3 are to be made. This layer is then covered with a photosensitive varnish on which the bars are optically projected as strips of light. The unexposed varnish between the bars is then dissolved by a selective solvent leaving the bars 3 covered with varnish and the material therebetween uncovered. A solvent for the bar material is then applied which removes the uncovered material leaving the bars 3 as shown in Fig. 1.

The bars 3 of Fig. 1 may also be formed by first coating the substrate 1 with a layer of photosensitive varnish and optically projecting thereon a number of equally spaced parallel bands of light representing the areas between bars 3. The location of bars 3 are as a result defined on the varnish by a number of parallel dark bands. The unexposed varnish, in the positions of the bars, is dissolved by a selective solvent leaving strips of the substrate uncovered. Metal is then electroplated onto the uncovered strips of substrate thus building up the bars 3.

Parallel bars may also be formed on the substrate by condensation from a vapor beam of the bar material directed normally to the substrate which has been previously covered with a mask. A suitable mask for this purpose may be made from a system of parallel closely spaced wires 4 as shown in Fig. 2.

Figure 3:
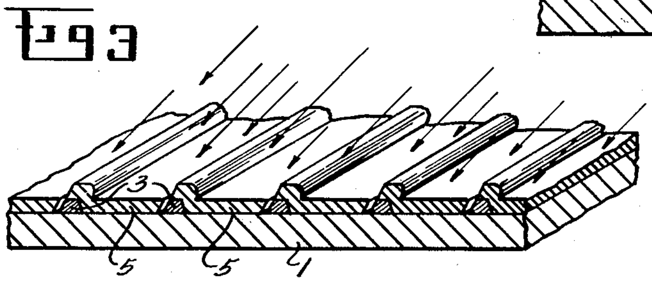
Fig. 3 shows the substrate and bars covered with auxiliary removable material.

After the bars are formed on the substrate by one of the above processes the spaces between the bars are filled with an easily removable auxiliary material 5 by condensation from a vapor beam of the auxiliary material directed at the substrate along an inclined path. The result of this step is shown in Fig. 3. Cadmium, selenium or antimony are suitable auxiliary materials.

The surface of the incomplete mosaic in Fig. 3 is next ground flat so as to form a system of alternate permanent strips 3 and removable strips 5. On top of the ground surface is then deposited a thin coating of the permanent flap material 6 preferably by condensation from a vapor beam of the material directed at an angle to the substrate that is the same as in Fig. 3. Silver or aluminum are suitable materials for the flaps. The result is illustrated in Fig. 4.

Figure 4:
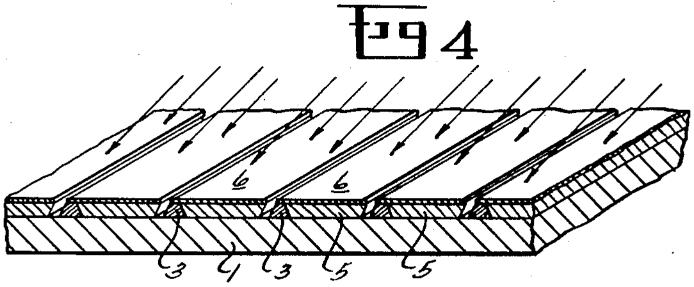
Fig. 4 shows the excess auxiliary material of Fig. 3 removed and the sample covered with flap material.

The permanent flap material 6, Fig. 4, is next divided into a number of equal rectangular areas by photoengraving along equally spaced parallel lines perpendicular to bars 3. This is accomplished by coating the sample of Fig. 4 with a photosensitive varnish and projecting thereon bands of light equal in width to the desired flap width. The resulting dark bands between the bands of light then define the lines along which the strips 6 are to be cut. The unexposed varnish under the dark bands is then dissolved by use of a selective solvent and the thus uncovered portions of strips 6 are etched through with a suitable solvent for the strip material.

Figure 5:
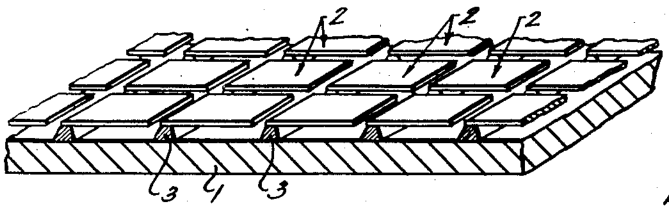
Fig. 5 shows the completed mosaic after removal of the auxiliary material.

After cutting the strips 6 as described above the auxiliary material 5 is removed by solution or sublimation depending upon the material used. Carbon disulphide is a suitable solvent for selenium whereas cadmium or antimony may be removed by sublimation. A portion of a completed mosaic is shown in Fig. 5.

Photosensitive varnishes and selective solvents therefor, suitable for use in the above process, are available commercially.

We claim:

1. The method of making an electrostatic shutter mosaic consisting of a multitude of flaps of elemental area each attached to a substrate along one edge, said method comprising the steps of forming on said substrate a plurality of straight parallel bars, depositing a layer of removable auxiliary material of uniform thickness over said bars and substrate by condensation from a vapor beam of said auxiliary material directed normal to said bars and at an angle to said substrate, grinding off said auxiliary material and bars to a uniform height above said substrate and to a height exposing said bars, depositing a uniform layer of flap material over said bars and auxiliary material by condensation from a vapor beam of said flap material having the same direction as said vapor beam of auxiliary material, removing said flap material along a plurality of narrow parallel equally spaced strips running perpendicular to said bars, and removing said auxiliary material.

2. The method in accordance with claim 1 in which said bars are formed by coating said substrate with a layer of the bar material, coating said bar material with photosensitive varnish, exposing parallel equally spaced strips on said varnish, dissolving the unexposed portions of said varnish by means of a selective solvent to uncover said bar material between said exposed strips, and removing said uncovered bar material by dissolution.

3. The method of claim 1 in which said bars are formed by coating said substrate with a photosensitive varnish, exposing all of said varnish except a plurality of parallel equally spaced strips marking the locations of said bars, dissolving the unexposed strips of varnish by means of a selective solvent to uncover said substrate, and electroplating metal onto the uncovered portions of said substrate to form said bars.

4. The method of claim 1 in which said bars are formed by condensation from a vapor beam of the bar material directed normally to said substrate through a mask covering those parts of the substrate between said bars.

5. The method of claim 1 in which the step of removing said flap material along a plurality of narrow parallel equally spaced strips running perpendicular to said bars is performed by coating said flap material with a photosensitive varnish, exposing all of said varnish except a plurality of narrow parallel equally spaced strips running perpendicular to said bars, dissolving the unexposed varnish with a selective solvent to uncover said flap material beneath the unexposed varnish, and dissolving the uncovered flap material.

RICHARD K. ORTHUBER.
JOHN E. CLEMENS.
BEN B. JOHNSTONE.

No references cited.